United States Patent
Xu et al.

(10) Patent No.: US 10,474,376 B2
(45) Date of Patent: Nov. 12, 2019

(54) MEMORY CONTROLLER, MEMORY SYSTEM INCLUDING THE SAME AND OPERATION METHOD OF MEMORY CONTROLLER

(71) Applicant: SK hynix Inc., Gyeonggi-do (KR)

(72) Inventors: Jing-Zhe Xu, Seoul (KR); Jung-Hyun Kwon, Seoul (KR); Sung-Eun Lee, Gyeonggi-do (KR); Jae-Sun Lee, Seoul (KR); Sang-Gu Jo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 76 days.

(21) Appl. No.: 15/598,418

(22) Filed: May 18, 2017

(65) Prior Publication Data

US 2018/0018114 A1 Jan. 18, 2018

(30) Foreign Application Priority Data

Jul. 18, 2016 (KR) ........................ 10-2016-0090502

(51) Int. Cl.
*G06F 12/12* (2016.01)
*G06F 3/06* (2006.01)
*G06F 12/02* (2006.01)
*G06F 12/1009* (2016.01)

(52) U.S. Cl.
CPC ............ *G06F 3/0619* (2013.01); *G06F 3/064* (2013.01); *G06F 3/0616* (2013.01); *G06F 3/0652* (2013.01); *G06F 3/0659* (2013.01); *G06F 3/0688* (2013.01); *G06F 12/0246* (2013.01); *G06F 12/1009* (2013.01); *G06F 2212/7201* (2013.01)

(58) Field of Classification Search
CPC .......................... G06F 3/0619; G06F 12/1009
USPC ........................................................ 711/103
See application file for complete search history.

(56) References Cited

U.S. PATENT DOCUMENTS

| | | | |
|---|---|---|---|
| 8,255,613 B2 | 8/2012 | Abali et al. | |
| 2007/0239944 A1* | 10/2007 | Rupanagunta | ........ G06F 3/0613 711/147 |
| 2008/0229048 A1* | 9/2008 | Murase | ................. G06F 3/0607 711/171 |

FOREIGN PATENT DOCUMENTS

KR 1020120136197 12/2012

* cited by examiner

*Primary Examiner* — Jae U Yu
(74) *Attorney, Agent, or Firm* — IP & T Group LLP

(57) ABSTRACT

An operating method of a memory controller may include determining a physical page to be accessed in a plurality of memory devices by mapping a logical address to a physical address; and determining a distribution pattern in which data of the physical page are distributed to the plurality of memory devices using the logical address.

19 Claims, 4 Drawing Sheets

FIG. 2

| LOGICAL ADDRESS | PHYSICAL ADDRESS | 120_0 | 120_1 | 120_2 | 120_3 | 120_4 |
|---|---|---|---|---|---|---|
| XX0 | 0 | D0 | D1 | D2 | D3 | ECC |
| XX1 | 0 | ECC | D0 | D1 | D2 | D3 |
| XX2 | 0 | D3 | ECC | D0 | D1 | D2 |
| XX3 | 0 | D2 | D3 | ECC | D0 | D1 |
| XX4 | 0 | D1 | D2 | D3 | ECC | D0 |
| XX5 | 0 | D0 | D1 | D2 | D3 | ECC |
| XX6 | 0 | ECC | D0 | D1 | D2 | D3 |
| XX7 | 0 | D3 | ECC | D0 | D1 | D2 |
| XX8 | 0 | D2 | D3 | ECC | D0 | D1 |
| XX9 | 0 | D1 | D2 | D3 | ECC | D0 |

FIG. 3A

| LOGICAL ADDRESS | PHYSICAL ADDRESS |
|---|---|
| ... | ... |
| 353 | 273 |
| ... | ... |
| 526 | 108 |
| ... | ... |

FIG. 3B

| DATA DISTRIBUTION PATTERN OF PHYSICAL PAGE 273 | | | | |
|---|---|---|---|---|
| 120_0 | 120_1 | 120_2 | 120_3 | 120_4 |
| D2 | D3 | ECC | D0 | D1 |

FIG. 3C

| DATA DISTRIBUTION PATTERN OF PHYSICAL PAGE 108 | | | | |
|---|---|---|---|---|
| 120_0 | 120_1 | 120_2 | 120_3 | 120_4 |
| ECC | D0 | D1 | D2 | D3 |

MEMORY CONTROLLER, MEMORY SYSTEM INCLUDING THE SAME AND OPERATION METHOD OF MEMORY CONTROLLER

CROSS-REFERENCE TO RELATED APPLICATIONS

The present application claims priority of Korean Patent Application No. 10-2016-0090502, filed on Jul. 18, 2016, which is incorporated herein by reference in its entirety.

BACKGROUND

1. Field

Exemplary embodiments of the present invention relate to a memory system including a plurality of memory devices and a memory controller for controlling the memory devices.

2. Description of the Related Art

In memory devices, such as NAND flash and Phase-Change Random Access Memory (PCRAM), the number of write operations that can be performed on a memory cell before the memory cell becomes unreliable is limited. For example, a PCRAM memory cell may have a limited number of write operations of about $10^6$ to $10^8$.

Accordingly, if write operations are concentrated on a specific cell region of a memory device, the service life of the memory device may be reduced substantially. To prevent such a concern, memory devices typically perform a wear leveling operation to distribute write operations more uniformly in the entire cell array of a memory device. A widely used method for wear leveling changes address mapping between a logical address and a physical address.

Many memory systems employ not only one memory device, but a plurality of memory devices. The plurality of memory devices may distribute and store data in units of pages. For example, data of one page formed of 80 bits may be distributed and stored in 5 memory devices, i.e., 16 bits per memory device. The data of a page are not changed in the same frequency, but specific data within a page may be more frequently changed. For example, if a page includes normal data and ECC data, the service life of a memory device that belongs to a plurality of memory devices and that stores the ECC data may reach the limit more quickly because the ECC data are more frequently changed than the normal data. Furthermore, normal data that is close to the Least Significant Bit (LSB) is more frequently changed than data close to the Most Significant Bit (MSB). Accordingly, the service life of a memory device that belongs to the plurality of memory devices and that stores data close to the LSB may reach the limit more quickly. That is, although the plurality of memory devices of a memory system performs the same number of write operations, the service life of a specific memory device may reach the limit more quickly.

SUMMARY

Various embodiments are directed to provide a technology in which a plurality of memory devices within a memory system can have a uniform service life.

In an embodiment, an operating method of a memory controller may include determining a physical page to be accessed in a plurality of memory devices by mapping a logical address to a physical address; and determining a distribution pattern in which data of the physical page are distributed to the plurality of memory devices using the logical address.

The mapping of the logical address to the physical address may be changed when the number that a specific operation is performed in the plurality of memory devices reaches a threshold value.

The specific operation may comprise at least one of a write operation and an erase operation.

At least one bit of the logical address may be used in determining the distribution pattern.

A certain positional number of a logical page corresponding to the physical page may be used in the determining of the distribution pattern In an embodiment, a memory system may include a plurality of memory devices suitable for being accessed by a physical address; and a memory controller suitable for controlling the memory devices, wherein the memory controller comprises: an address mapping circuit suitable for mapping a logical address to the physical address; and a data distribution circuit suitable for determining a distribution pattern in which data of a physical page to be accessed in the plurality of memory devices using the physical address are distributed to the plurality of memory devices using the logical address.

The mapping of the logical address to the physical address may be changed when the number that a specific operation is performed in the plurality of memory devices reaches a threshold value.

The specific operation may comprise at least one o a write operation and an erase operation.

The data distribution circuit may determine the distribution pattern based on some bits of the logical address.

The plurality of memory devices may share an address channel and a command channel and has independent data channels for each memory device.

The memory controller may further include a host interface suitable for communicating with a host; a scheduler suitable for determining a sequence of operations to be instructed to the plurality of memory devices; a command generator suitable for generating a command to be applied to the plurality of memory devices; an error correction circuit suitable for correcting an error of data read from the plurality of memory devices; and a memory interface suitable for communicating with the plurality of memory devices.

In an embodiment, a memory controller controlling a plurality of memory devices accessed by a physical address may include an address mapping circuit suitable for mapping a logical address to the physical address; and a data distribution circuit suitable for determining a distribution pattern in which data of a physical page to be accessed in the plurality of memory devices using the physical address are distributed to the plurality of memory devices using the logical address.

The mapping of the logical address to the physical address may be changed when the number that a specific operation is performed in the plurality of memory devices reaches a threshold value.

The specific operation may comprise at least one of a write operation and an erase operation.

The data distribution circuit may determine the distribution pattern based on at least one bit of the logical address.

The data distribution circuit may determine the distribution pattern based on a certain positional number of a logical page corresponding to the physical page.

The memory controller may further include a host interface suitable for communicating with a host; a scheduler suitable for determining a sequence of operations to be instructed to the plurality of memory devices; a command generator suitable for generating a command to be applied to the plurality of memory devices; an error correction circuit suitable for correcting an error of data read from the plurality of memory devices; and a memory interface suitable for communicating with the plurality of memory devices.

The memory interface may be suitable for transferring a command to the plurality of memory devices through a command channel shared by the plurality of memory devices, transferring the physical address to the plurality of memory devices through an address channel shared by the plurality of memory devices, and sending and receiving data to and from the plurality of memory devices through a plurality of data channels independent for the plurality of memory devices.

BRIEF DESCRIPTION OF THE DRAWINGS

The above and other features and advantages of the present invention will become more apparent to those skilled in the art to which the present invention pertains by the following detailed description with reference to the attached drawings in which:

FIG. 2 is a table showing a distribution pattern in which normal data and ECC data of a physical page are distributed to a plurality of memory devices in response to a logical address, by a data distribution circuit of the memory system of FIG. 1.

FIGS. 3A to 3C are tables showing a distribution pattern in which normal data and ECC data of a physical page are distributed to a plurality of memory devices in various mapping situations.

DETAILED DESCRIPTION

Figure 1:
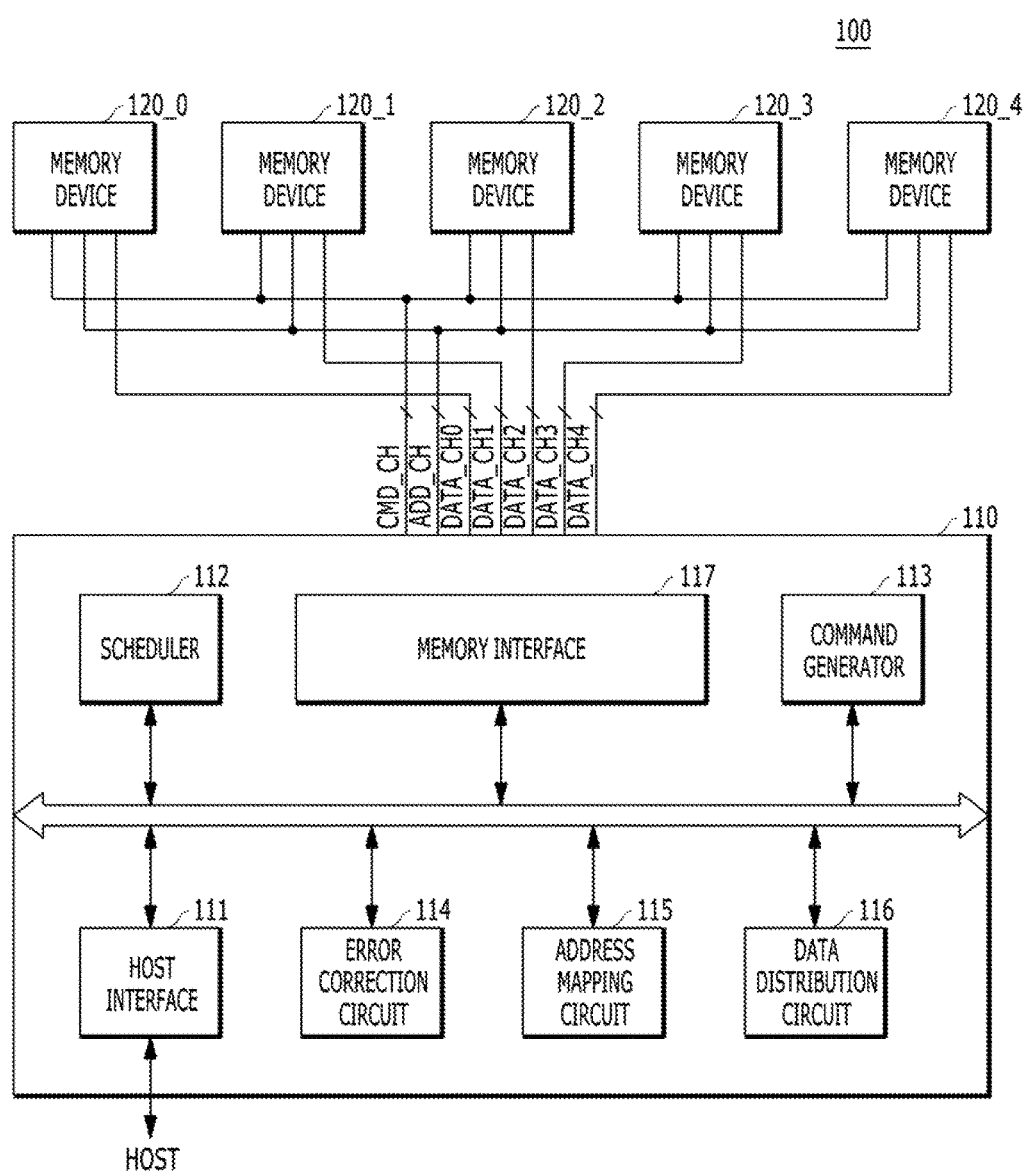
FIG. 1 shows a memory system according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

FIG. 1 shows a memory system 100 according to an embodiment of the present invention.

Referring to FIG. 1, the memory system 100 may include a memory controller 110 operatively coupled to a plurality of memory devices 120_0 to 120_4.

The memory controller 110 may control an operation of the plurality of memory devices 120_0 to 120_4 in response to a request received from a host. The host may be any suitable electronic device and may include at least one of a Central Processing Unit (CPU) or a Graphic Processing Unit (GPU). The memory controller 110 may include a host interface 111, a scheduler 112, a command generator 113, an error correction circuit 114, an address mapping circuit 115, a data distribution circuit 116, and a memory interface 117 operatively coupled to an internal bus.

The host interface 111 may provide an interface between the memory controller 110 and the host. Any suitable interface may be used. Requests from the host may be received through the host interface 111, and processing results of the requests may be transmitted to the host through the host interface 111.

The scheduler 112 may determine a sequence of the requests from the host to be instructed to the plurality of memory devices 120_0 to 120_4. The scheduler 112 may determine the sequence of the requests from the host to be instructed to the plurality of memory devices 120_0 to 120_4 so that the sequence in which the requests are received from the host are different from the sequence of operations to be instructed to the plurality of memory devices 120_0 to 120_4, for improving a performance characteristic of at least one of the memory devices 120_0 to 120_4. For example, although the host may have first requested a read operation for the plurality of memory devices 120_0 to 120_4 followed by a request for a write operation, the scheduler 112 may control the sequence of the operations so that the write operation is performed prior to the read operation.

The command generator 113 may generate commands to be applied to the plurality of memory devices 120_0 to 120_4 according to the sequence of operations determined by the scheduler 112.

The error correction circuit 114 may generate Error Correction Code (ECC) data using normal data when a write operation is performed. The ECC data may be written along with the normal data in the plurality of memory devices 120_0 to 120_4. Furthermore, when a read operation is performed, the error correction circuit 114 may correct an error of normal data read from the plurality of memory devices 120_0 to 120_4 using ECC data read along with the normal data.

The address mapping circuit 115 may map a logical address to a physical address. The logical address may be an address provided from the host. The physical address may be an address which corresponds to an actual memory location in one of the plurality of memory devices, e.g., a physical page and may be used to access the plurality of memory devices 120_0 to 120_4. Since a logical page is designated by the logical address and a physical page is designated by the physical address, the address mapping circuit 115 may be considered to map the logical page to the physical page. In this case, the page may refer to a minimum unit of the read and write operations of the plurality of memory devices 120_0 to 120_4. The address mapping circuit 115 may be configured to change the mapping of the logical address to the physical address whenever the number that a specific operation is performed in the plurality of memory devices 120_0 to 120_4 reaches a threshold value. The specific operation may be, for example, write operation or an erase operation. For example, the address mapping circuit 115 may change the mapping whenever 100 write operations are performed to the plurality of memory devices 120_0 to 120_4. Another example, the address mapping circuit 115 may change the mapping whenever 100 erase operations are performed to the plurality of memory devices 120_0 to 120_4. The address mapping circuit 115, by periodically changing the mapping of the logical addresses to the physical addresses, may ensure that physical pages are used more uniformly in the plurality of memory devices 120_0 to 120_4.

The data distribution circuit 116 may determine a distribution pattern in which data within a physical page are distributed to the plurality of memory devices 120_0 to 120_4. One physical page may include normal data of plural bits and ECC data of plural bits. For example, one physical page may include normal data of 64 bytes (i.e., 512 bits) and FCC data of 16 bytes (i.e., 128 bits). The data distribution circuit 116 may distribute all of the 80 bytes data of a physical page within a physical page divided between the 5 memory devices 120_0 to 120_4 by 16 bytes per memory device. The distribution pattern of the data distribution circuit 116 may be determined by a logical address corresponding to a physical page to be accessed.

The memory interface 117 may provide an interface between the memory controller 110 and the plurality of memory devices 120_0 to 120_4. Any suitable interface may be used. The memory interface 117 may transfer the commands generated by the command generator 113 to the plurality of memory devices 120_0 to 120_4 using a command channel CMD_CH, and may transfer physical addresses to the plurality of memory devices 120_0 to 120_4 using an address channel ADD_CH. Furthermore, the memory interface 117 may send/receive data to from the plurality of memory devices 120_0 to 120_4 using data channels DATA_CH0 to DATA_CH4. Hence, as illustrated in FIG. 1, the command channel CMD_CH and the address channel ADD_CH may be shared by the plurality of memory devices 120_0 to 120_4. By contrast, the data channels DATA_CH0 to DATA_CH4 may be independent from one another, that is, each of the data channels DATA_CH0 to DATA_CH4 may be allocated to a respective memory device among the plurality of memory devices 120_0 to 120_4. Each of the command channel CMD_CH and the address channel ADD_CH may include a plurality of lines. Each of the data channels DATA_CH0 to DATA_CH4 may include a plurality of lines. In case where the total data of a physical page are composed of 80 bytes, when a read or write operation is performed, data of 16 bytes may be transmitted through each of the data channels DATA_CH0 to DATA_CH4. Each of the data channels DATA_CH0 to DATA_CH4 may include 16 data lines, and may send data of 16 bytes with a burst length of 8 (i.e., 128 bits=16*8 bits) to a corresponding one of the plurality of memory devices 120_0 to 120_4.

The plurality of memory devices 120_0 to 120_4 may perform an operation, such as a read or write operation, under the control of the memory controller 110. The plurality of memory devices 120_0 to 120_4 may perform the same operation at the same time because they share the command channel CMD_CH and the address channel ADD_CH. Each of the plurality of memory devices 120_0 to 120_4 may include a memory device that requires a wear leveling operation because the number of write operations to be performed on one memory cell is limited. For example, each of the plurality of memory devices 120_0 to 120_4 may include a memory device having a limited service life, such as a Phase-Change Random Access Memory (PCRAM).

FIG. 2 is a table showing a distribution pattern in which data of a physical page are distributed to the plurality of memory devices 120_0 to 120_4 in response to a logical address, by the data distribution circuit 116 of FIG. 1.

In FIG. 2, reference numbers "XX0" to "XX9" written in the logical address column denote logical pages designated by logical addresses. For example, "XX0" indicates that a first positional number of a logical page designated by a logical address is 0, and "XX1" indicates that a first positional number of a logical page designated by a logical address is 1. In FIG. 2, reference numbers "0" written in a physical address column denote physical pages designated by physical addresses. For example, since FIG. 2 shows how the data distribution pattern of a first physical page has been changed in response to a logical address, all of numbers written below the physical address are assigned to 0.

In FIG. 2, "D0" to "D3" and "ECC" written in the plurality of memory device columns 120_0 to 120_4 denote normal data and ECC data of the first physical page, respectively. Each of the normal data D0 to D3 may be indicative of 8 bytes of 64 bytes of the normal data of the first physical page. For example, first normal data D0 may be indicative of the Least Significant Bit (LSB) 16 bytes of 64 bytes, second normal data D1 may be indicative of 16 bytes following the bit position of the first normal data D0, third normal data D2 may be indicative of 16 bytes following the bit position of the second normal data D1, and fourth normal data D3 may be indicative of the Most Significant Bit (MSB) 16 bytes of the 64 bytes. Furthermore, the ECC data ECC may be indicative of 16 bytes of the ECC data of the first physical page.

From FIG. 2, it may be seen that a distribution pattern in which all of the normal data D0 to D3 and the ECC data ECC of the first physical page are distributed to the plurality of memory devices 120_0 to 120_4 based on the first positional number of the logical page corresponding to the first physical page, that is, some bits of a logical address which is used to access the first physical page. Since the logical page mapped to the first physical page by the address mapping circuit 115 is periodically changed, a distribution pattern in which all of the normal data D0 to D3 and the ECC data ECC of the first physical page are distributed to the plurality of memory devices 120_0 to 120_4 may also be periodically changed. Accordingly, the plurality of memory devices 120_0 to 120_4 can have uniform service life because normal data close to the LSB and ECC data, which are frequently changed, are uniformly written in the plurality of memory devices 120_0 to 120_4.

FIG. 2 illustrates an example in which the value of some bits of a logical address is used to determine a distribution pattern in which the normal data D0 to D3 and the ECC data ECC of the first physical page are distributed to the plurality of memory devices 120_0 to 120_4 without any change. In some embodiments, the value of some bits of a logical address may not be used without any change, but specific operation may be performed on the value of some bits of a logical address and a distribution pattern may be determined based on the results of the operation. Since the value of a logical address corresponding to the first physical page is periodically changed, a distribution pattern in which the normal data D0 to D3 and the ECC data ECC of the first physical page are distributed to the plurality of memory devices 120_0 to 120_4 may be periodically changed although some bits of the logical address is used by any method.

FIG. 2 illustrates the distribution pattern in which the data distribution circuit 116 distributes the normal data D0 to D3 and the ECC data ECC of the first physical page to the plurality of memory devices 120_0 to 120_4. The normal data D0 to D3 and the ECC data ECC of other physical pages may also be distributed to the plurality of memory devices 120_0 to 120_4 in the same manner.

FIGS. 3A to 3C are tables showing a distribution pattern in which normal data D0 to D3 and ECC data ECC of a physical page are distributed to the plurality of memory devices 120_0 to 120_4 in various mapping situations.

FIG. 3A is a table showing some of a mapping table of a logical address and a physical address. From FIG. 3A, it may be seen that a logical page 353 is mapped to a physical page 273 and a logical page 526 is mapped to a physical page 108.

FIG. 3B illustrates a distribution pattern in which the normal data D0 to D3 and the ECC data ECC of the physical page 273 are distributed to the plurality of memory devices 120_0 to 120_4 in a mapping situation of FIG. 3A. From FIG. 3B, it may be seen that the normal data D0 to D3 and the ECC data ECC of the physical page 273 are distributed to the plurality of memory devices 120_0 to 120_4 in order of (D2, D3, ECC, D0, D1) because the first positional number of the logical page corresponding to the physical page 273 is 3.

FIG. 3C illustrates a distribution pattern in which the normal data D0 to D3 and the ECC data ECC of the physical page 108 are distributed to the plurality of memory devices 120_0 to 120_4 in a mapping situation of FIG. 3A. From FIG. 3C, it may be seen that the normal data D0 to D3 and the ECC data ECC of the physical page 108 are distributed to the plurality of memory devices 120_0 to 120_4 in order of (ECC, D0, D1, D2, D3) because the first positional number of the logical page corresponding to the physical page 108 is 6.

Figure 4:
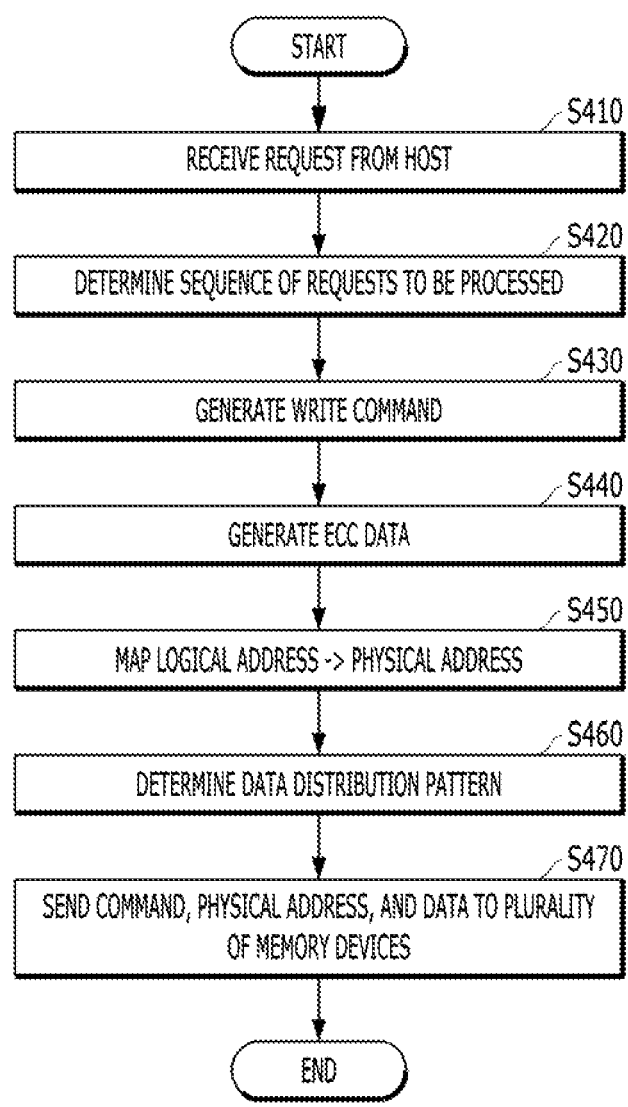
FIG. 4 is a flowchart illustrating an operation of a memory controller when a write operation is requested by a host.

FIG. 4 is a flowchart illustrating an operation of the memory controller 110 when a write operation is requested by the host.

Referring to FIG. 4, first, a request from the host may be received through the host interface 111 at step S410. The request from the host may include information indicating a write operation to be performed by the plurality of memory devices 120_0 to 120_4, a logical address indicative of a logical page to be accessed in the plurality of memory devices 120_0 to 120_4, and normal data D0 to D3 to be written in the plurality of memory devices 120_0 to 120_4.

The scheduler 112 may determine a sequence of requests to be processed if the number of requests received from the host is plural at step S420. Furthermore, the command generator 113 may generate a write command that enables the plurality of memory devices 120_0 to 120_4 to perform the write operation at step S430.

The error correction circuit 114 may generate ECC data ECC using the normal data D0 to D3 to be written in the plurality of memory devices 120_0 to 120_4 at step S440.

The address mapping circuit 115 may map the logical address, received from the host, to a physical address at step S450. Accordingly, a physical page to be accessed in the plurality of memory devices 120_0 to 120_4 may be determined.

The data distribution circuit 116 may determine a distribution pattern in which the normal data D0 to D3 and the ECC data ECC of the physical page to be accessed using the logical address received from the host are distributed to the plurality of memory devices 120_0 to 120_4 at step S460. The distribution pattern may be determined using a method, such as that described with reference to FIGS. 2 and 3.

The memory interface 117 may send the command, the physical address, and the normal data D0 to D3 and the ECC data ECC to the plurality of memory devices 120_0 to 120_4 at step S470. The command may be transmitted through the command channel CMD_CH, and the physical address may be transmitted through the address channel ADD_CH. The normal data D0 to D3 and the ECC data ECC may be transmitted through the data channels DATA_CH0 to DATA_ CH4. Which one of the normal data D0 to D3 and the ECC data ECC will be transmitted through which one of the data channels DATA_CH0 to DATA_CH4, that is, a corresponding relation between the normal data D0 to D3 and the ECC data ECC and the data channels DATA_CH0 to DATA_CH4, may be determined depending on the distribution pattern determined at step S460.

Figure 5:
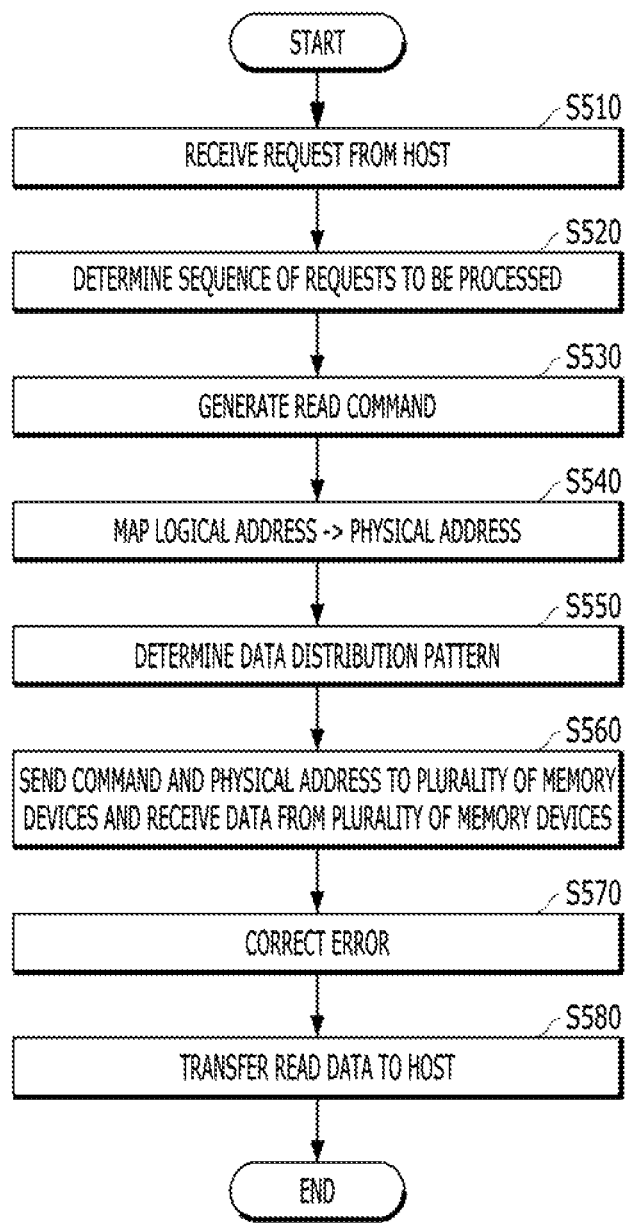
FIG. 5 is a flowchart illustrating an operation of a memory controller when a read operation is requested by a host.

FIG. 5 is a flowchart illustrating an operation of the memory controller 110 when a read operation is requested by the host.

Referring to FIG. 5, first, a request from the host may be received through the host interface 111 at step S510. The request from the host may include information indicating of a read operation to be performed by the plurality of memory devices 120_0 to 120_4 and a logical address indicative of a logical page to be accessed in the plurality of memory devices 120_0 to 120_4.

The scheduler 112 may determine a sequence of requests to be processed if the number of requests received from the host is plural at step S520. Furthermore, the command generator 113 may generate a read command that enables the plurality of memory devices 120_0 to 120_4 to perform the read operation at step S530.

The address mapping circuit 114 may map the logical address, received from the host, to a physical address at step S540. Accordingly, a physical page to be accessed in the plurality of memory devices 120_0 to 120_4 may be determined.

The data distribution circuit 116 may determine a distribution pattern in which normal data D0 to D3 and ECC data ECC of the physical page to be accessed using the logical address received from the host are distributed to the plurality of memory devices 120_0 to 120_4 at step S550. The distribution pattern may be determined using a method, such as that described with reference to FIGS. 2 and 3.

The memory interface 117 may send the command and the physical address to the plurality of memory devices 120_0 to 120_4, and may receive the normal data D0 to D3 and the FCC data ECC from the plurality of memory devices 120_0 to 120_4 at step S560. The command may be transmitted through the command channel CMD_CH, and the physical address may be transmitted through the address channel ADD_CH. Furthermore, the memory interface 117 may receive the normal data D0 to D3 and the ECC data ECC, read from the plurality of memory devices 120_0 to 120_4, through the data channels DATA_CH0 to DATA_CH4. A corresponding relation between the normal data D0 to D3 and the ECC data ECC and the data channels DATA_CH0 to DATA_CH4 may be known using a distribution pattern determined at step S550.

The error correction circuit 114 may receive the normal data D0 to D3 and the ECC data ECC through the memory interface 117 and correct an error of the normal data D0 to D3 using the ECC data ECC at step S570. Furthermore, the normal data D0 to D3 (i.e., read data requested by the host) whose error has been corrected by the error correction circuit 114 may be transferred to the host through the host interface 111 at step S580.

In accordance with embodiments of the present invention, a plurality of memory devices within a memory system can have a more uniform service life.

Although various embodiments have been described for illustrative purposes, it will be apparent to those skilled in the art that various changes and modifications may be made without departing from the spirit and scope of the invention as defined in the following claims.

What is claimed is:

1. An operating method of a memory controller, comprising:
    determining a physical page to be accessed in a plurality of memory devices by mapping a logical address to a physical address; and
    determining a distribution pattern in which multiple units of data of the physical page are distributed to the plurality of memory devices using the logical address, each of the multiple units of data having a different data changing rate and at least two of the multiple units of data having a high data changing rate relative to remaining units of data of the multiple units of data;
    wherein each of the multiple units of data is one of a first type of data and a second type of data,
    wherein the distribution pattern identifies, for each unit of data, its type and the memory device, among the plurality of memory devices, in which it is stored, and
    wherein the distribution pattern is periodically changed using address mapping information to maintain uniform distribution of the at least two data units having a high data changing rate among the plurality of memory devices.

2. The operating method of claim 1, wherein the mapping of the logical address to the physical address is changed when the number of times that a specific operation is performed in the plurality of memory devices reaches a threshold value.

3. The operating method of claim 2, wherein the specific operation comprises at least one of a write operation and an erase operation.

4. The operating method of claim 1, wherein at least one bit of the logical address is used in determining the distribution pattern.

5. The operating method of claim 1, wherein a certain positional number of a logical page corresponding to the physical page are used in the determining of the distribution pattern.

6. A memory system comprising:
    a plurality of memory devices suitable for being accessed by a physical address; and
    a memory controller suitable for controlling the memory devices,
    wherein the memory controller comprises:
        an address mapping circuit suitable for mapping a logical address to the physical address; and
        a data distribution circuit suitable for determining a distribution pattern in which multiple units of data of a physical page to be accessed in the plurality of memory devices using the physical address are distributed to the plurality of memory devices using the logical address, each of the multiple units of data having a different data changing rate and at least two of the multiple units of data having a high data changing rate relative to remaining units of data of the multiple units of data;
    wherein each of the multiple units of data is one of a first type of data and a second type of data,
    wherein the distribution pattern identifies, for each unit of data, its type and the memory device, among the plurality of memory devices, in which it is stored, and
    wherein the distribution pattern is periodically changed using address mapping information to maintain uniform distribution of the at least two data units having a high data changing rate among the plurality of memory devices.

7. The memory system of claim 6, wherein the mapping of the logical address to the physical address is changed when the number of times that a specific operation is performed in the plurality of memory devices reaches a threshold value.

8. The memory system of claim 7, wherein the specific operation comprises at least one of a write operation and an erase operation.

9. The memory system of claim 6, wherein the data distribution circuit determines the distribution pattern based on some bits of the logical address.

10. The memory system of claim 6, wherein the data distribution circuit determines the distribution pattern based on a certain positional number of a logical page corresponding to the physical page.

11. The memory system of claim 6, wherein the plurality of memory devices shares an address channel and a command channel and each of the plurality of memory devices has an independent data channel.

12. The memory system of claim 6, wherein the memory controller further comprises:
    a host interface suitable for communicating with a host;
    a scheduler suitable for determining a sequence of operations to be instructed to the plurality of memory devices;
    a command generator suitable for generating a command to be applied to the plurality of memory devices;
    an error correction circuit suitable for correcting an error of data read from the plurality of memory devices; and
    a memory interface suitable for communicating with the plurality of memory devices.

13. A memory controller controlling a plurality of memory devices accessed by a physical address, the memory controller comprising:
    an address mapping circuit suitable for mapping a logical address to the physical address; and
    a data distribution circuit suitable for determining a distribution pattern in which multiple units of data of a physical page to be accessed in the plurality of memory devices using the physical address are distributed to the plurality of memory devices using the logical address, each of the multiple units of data having a different data changing rate and at least two of the multiple units of data having a high data changing rate relative to remaining units of data of the multiple units of data;
    wherein each of the multiple units of data is one of a first type of data and a second type of data,
    wherein the distribution pattern identifies, for each unit of data, its type and the memory device, among the plurality of memory devices, in which it is stored, and
    wherein the distribution pattern is periodically changed using address mapping information to maintain uniform distribution of the at least two data units having a high data changing rate among the plurality of memory devices.

14. The memory controller of claim 13, wherein the mapping of the logical address to the physical address is changed when the number of times that a specific operation is performed in the plurality of memory devices reaches a threshold value.

15. The memory controller of claim 14, wherein the specific operation comprises at least one of a write operation and an erase operation.

16. The memory controller of claim 13, wherein the data distribution circuit determines the distribution pattern based on at least one bit of the logical address.

17. The memory controller of claim 13, wherein the data distribution circuit determines the distribution pattern based on a certain positional number of a logical page corresponding to the physical page.

18. The memory controller of claim 13, further comprising:
- a host interface suitable for communicating with a host;
- a scheduler suitable for determining a sequence of operations to be instructed to the plurality of memory devices;
- a command generator suitable for generating a command to be applied to the plurality of memory devices;
- an error correction circuit suitable for correcting an error of data read from the plurality of memory devices; and
- a memory interface suitable for communicating with the plurality of memory devices.

19. The memory controller of claim 18, wherein the memory interface is suitable for:
- transferring a command to the plurality of memory devices through a command channel shared by the plurality of memory devices,
- transferring the physical address to the plurality of memory devices through an address channel shared by the plurality of memory devices, and
- sending and receiving data to and from the plurality of memory devices through a plurality of data channels for the plurality of memory devices, respectively.

* * * * *